Sept. 19, 1967 S. H. PITT 3,342,127

HIGH SPEED PRINTING DEVICE WITH RECIPROCABLE TYPE BAR

Filed May 9, 1966

4 Sheets-Sheet 1

INVENTOR
SOLOMON H. PITT

BY Sheldon Kapustin

ATTORNEY

HIGH SPEED PRINTING DEVICE WITH RECIPROCABLE TYPE BAR

Filed May 9, 1966

4 Sheets-Sheet 2

United States Patent Office 3,342,127

Patented Sept. 19, 1967

3,342,127

HIGH SPEED PRINTING DEVICE WITH RECIPROCABLE TYPE BAR

Solomon H. Pitt, 18 Everturn Circle, Norristown, Pa. 19401

Filed May 9, 1966, Ser. No. 548,584
18 Claims. (Cl. 101—93)

ABSTRACT OF THE DISCLOSURE

A high speed printer operating in the serial mode comprising a continuously reciprocating print bar and a plurality of print hammers wherein the pitch of the character types on the print bar is greater than the pitch of the print hammers.

This is a continuation-in-part of application S.N. 466,589 filed April 8, 1965.

This invention relates to high speed printing devices and more particularly to an improved form of high speed printing device employing a print bar or band which moves in a direction transverse to the direction of movement of a print receiving record.

In order that the information from a high speed computing system be readily usable it must be made available in a printed form upon a record as rapidly as possible. Certain increases in the speed of printing devices have been achieved by the use of the parallel printing mode with printing drums of the type that make the same character type available to each column of a record, simultaneously. Such a system permits the printing in all columns which contain the same character, simultaneously. However, this increase in speed necessitates a great increase in the amount of equipment and the power required by the system. Certain disadvantages are also encountered which effect the print quality across a print line. One disadvantage is that variations in the travel time of a print hammer associated with a particular column on the record will effect the alignment of the printed character thereon as well as its color quality. This results because the print drum is constantly rotating. Therefore, if the print hammer hits solidly on the bottom of a character type, the bottom of the character type will be dark while the top will be light. Also if the hammer arrives very late, the printing of only the last portion of the character type may result. The effects of these defects is to give poor horizontal alignment of the printed characters in a row and poor print quality. These aforementioned defects are objectional to the eye. To correct these defects requires complex equipment and continuous maintenance of the prior art equipment.

The problem of horizontal alignment was eliminated by the development of the band or bar type of printing device wherein a font of character type was caused to move in a plane transverse to the direction of record movement. The record could then be driven against the band or bar mounted type or the type moved against the record depending on the particular device. The type movement against the record is accomplished by mounting a plurality of hammers along the width of the record. Each hammer can be individually selected and when selected strikes against either the rear portion of the record or the rear of the type causing the type to move toward the record. Since an ink ribbon is interspaced between the record and the type, a character would be printed on the record.

The technique employed for the selection of print hammers in the prior art devices requires the use of a buffer or intermediate memory in which a line of the message to be printed is stored. In these devices, as each character on the type bar approaches a printing position, a character of the message is compared with it. If there is agreement between the character of the message and the character on the type bar approaching a column position on the record where the character of the message should be printed, the print hammer associated with this column position is fired.

In the prior art devices using a print bar the parallel printing mode is employed; that is, the first character of the message is compared against the character on the bar approaching the first column of the record; a second character of the message is compared against the character on the bar approaching the second column of the record and so on. Wherever agreement is found as these comparisons take place a record of the decision is kept. For example, if the second, tenth and sixteenth characters of the message are the same as the characters on the bar approaching the second, tenth and sixteenth columns on the record, decision storage elements associated with the print hammers for the second, tenth and sixteenth columns are activated. Usually, in the parallel printing mode one decision storage element is associated with each printing hammer. After all the characters of the message are read out of the buffer memory and each one is compared against a character from the print bar, then printing takes place simultaneously (or in parallel) at all those column positions where agreement was found.

In the present invention the technique of serial printing is employed and the use of decision storage elements is obviated, as shall be shown. In serial printing the first character of the message in the buffer memory is compared against the character on the bar as the bar approaches the first columnar position on the record. If agreement is obtained the hammer associated with this position is then fired. Thereafter, the second character of the message is compared against the character on the bar approaching the second columnar position of the record. The hammer associated with the second column is fired if comparison is obtained. This process goes on until all the characters of the message read out of the buffer are compared and printing takes place as soon as agreement is found. Printing an entire line requires that every character in the font on the bar pass every columnar position on the record.

In using the serial printing technique, if the conventional relationship between the print hammers and the characters of the font is maintained, the characters of the printed message will not be evenly horizontally spaced. The conventional techniques of the prior art devices required that there be alignment between the characters on the print bar and the print hammers; i.e., the pitch of the type hammers and the pitch of the type on the bar would be the same. This was necessary in parallel printing because all the print hammers were fired simultaneously. In the instant invention the type on the bar is uniformly displaced at a pitch which is greater than the uniform pitch of the print hammers. However, the center line of the striking surface of the hammer associated with a column position of the record is still in line with the center line of that position, as in the prior art devices. The difference in the pitch of the type and the print hammers compensates for the time required for obtaining each character of the message from the buffer memory and comparing it with the characters in order on the type bar.

In the specific embodiment described herein the print bar is moved transverse to the direction of the record motion. A hammer assembly is mounted behind the record consisting of one print hammer, two columns wide, for each two of the character spaces which may be printed in a line. However, it should be noted that the invention is equally applicable where there is one print hammer, one column wide, for every space on the record.

Each print hammer is mounted in a position aligned with the interspace between two character spaces of the record and bears a hammer face of sufficient width to span both of the adjacent character spaces. A single print hammer actuator is associated with each print hammer and is used to cause printing in either of the character spaces spanned by the print hammer. Individual character type are placed upon the print bar in character spaces substantially corresponding to alternate character spaces upon the record. The character type during a first direction of movement of the print bar is positioned adjacent one-half of the print hammer face resulting in the absence of character type adjacent the second half of the print hammer face. The operation of the print hammers at this time will cause printing on the record in alternate character spaces (i.e. column positions on the record); for example, the odd character spaces. During a second direction of movement of the print bar, the character type is positioned adjacent the second half of the print hammer face resulting in the absence of character type adjacent the first half of the print hammer face. The operation of the print hammers at this time causes printing on the record in the alternate character spaces i.e., the even spaces, thus completing the printing of the line. The type on the bar, as indicated above, is not mounted upon the print bar in complete alignment with the record character spaces to provide for required memory reference. As the desired character type on the surface of the print bar moves in line with the space in which the character is to be printed, the hammer is fired, causing the record to move against a ribbon and then against the character type to thereby print that character.

The print bar has marker notations upon it which are used to identify the characters on the bar and their relationship to the record and to provide necessary timing pulses. A first addressable storage device or buffer memory is employed to store all the characters of the message to be printed across a single line. A code generator is employed to produce the coded representations of the character type found upon the surface of the bar. Continual comparison is made, as the print bar traverses the record width, between the characters stored for printing and the character type available for printing. When a comparison is found to exist, a hammer is fired to cause the printing of that character. The comparison has indicated that at a particular column position, a character of the message matches the then available character type. As the print bar moves one more columnar position (where there are single width hammers), the message in the memory is again compared character by character against the type on the bar for the next printing operation. This process goes on until every character in the font passes each column position on the record after which the entire line has been printed.

The aforementioned advantages and features of the invention will be pointed out in the following descriptions and claims, and illustrated in the accompanying drawings which disclose, by way of example, the principles of the invention and the best mode which has been contemplated for carrying it out.

Figures 1, 2, 5:
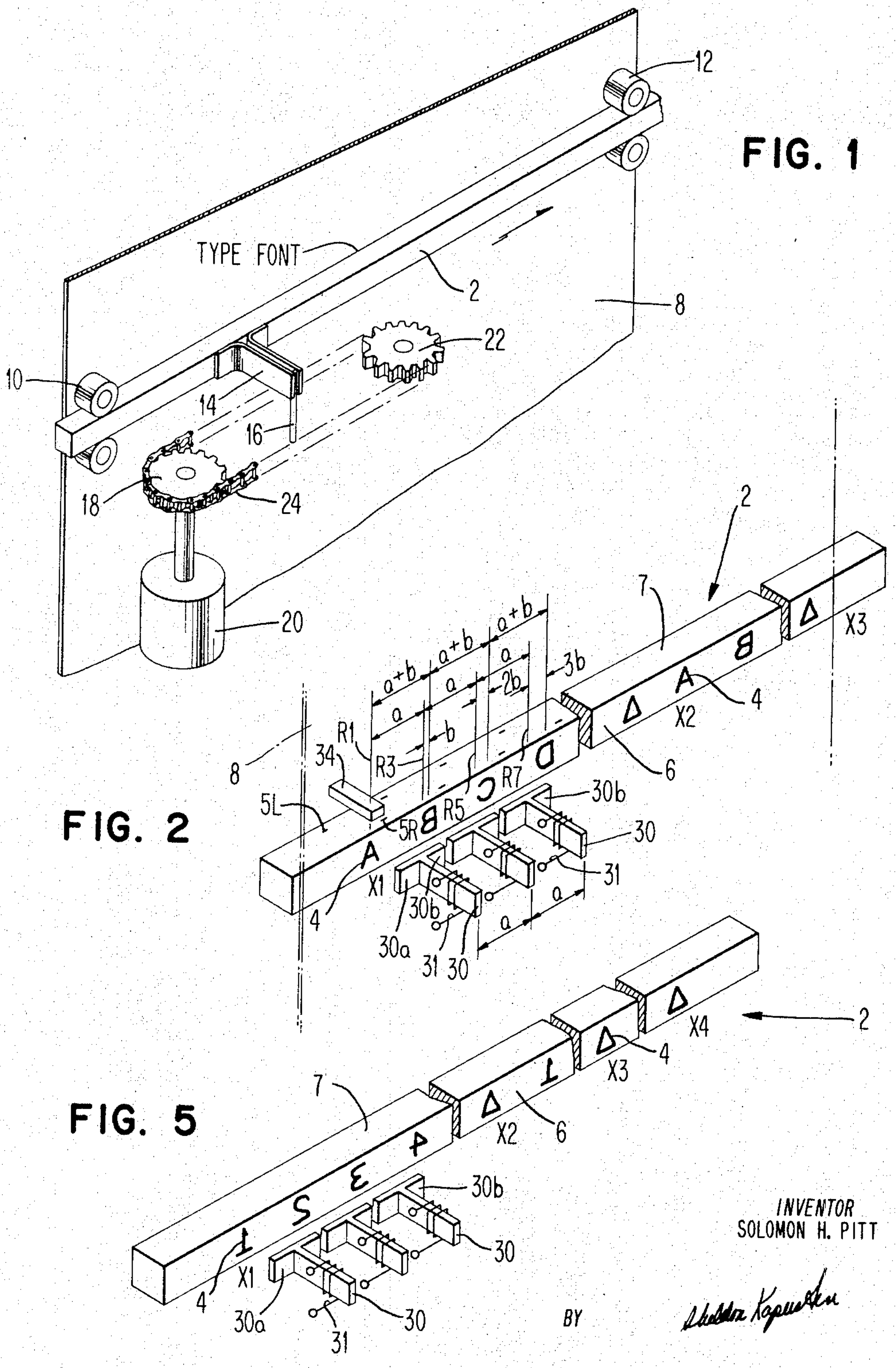
FIGURE 1 illustrates the printing bar and drive mechanism therefor as viewed from the front of the print mechanism.
FIGURE 2 is an illustration of the printing bar of FIGURE 1 and shows the location of the character type upon a first surface as well as the sprocket notations upon a second surface.
Figure 3A:
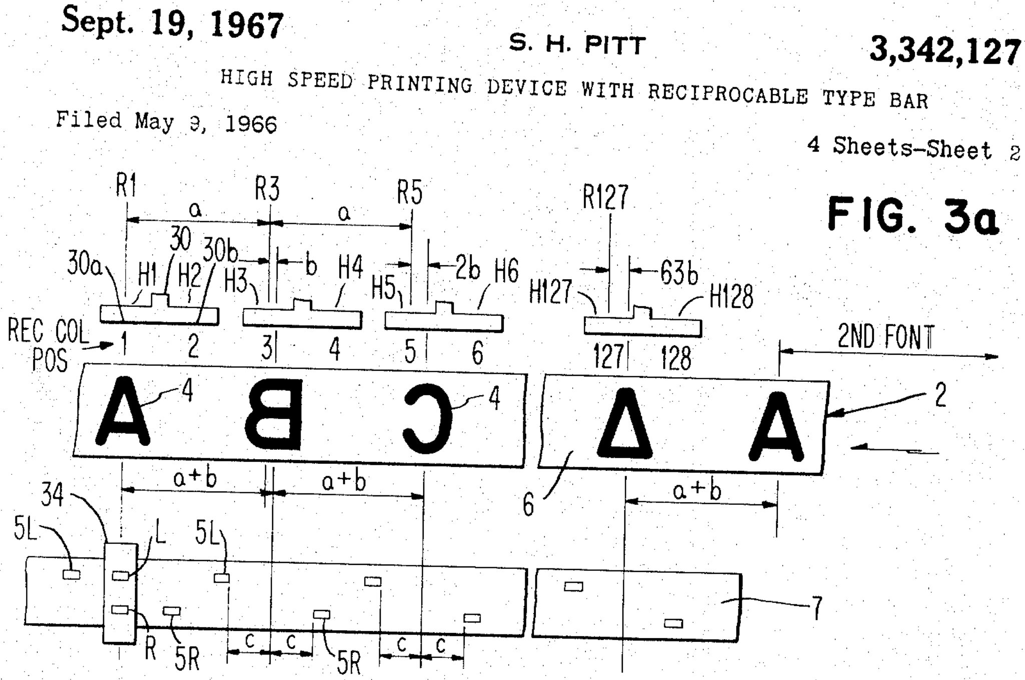
Figure 3B:
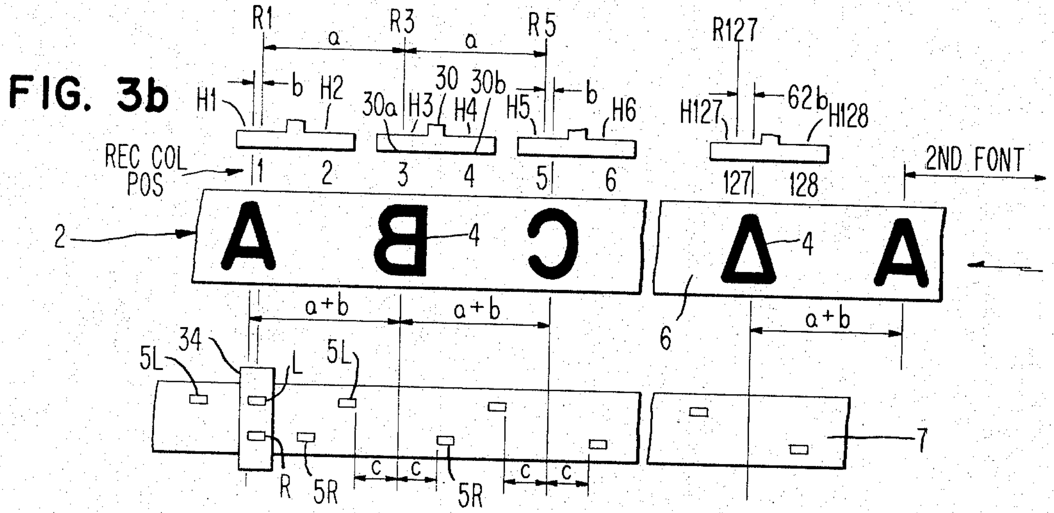
Figure 3C:
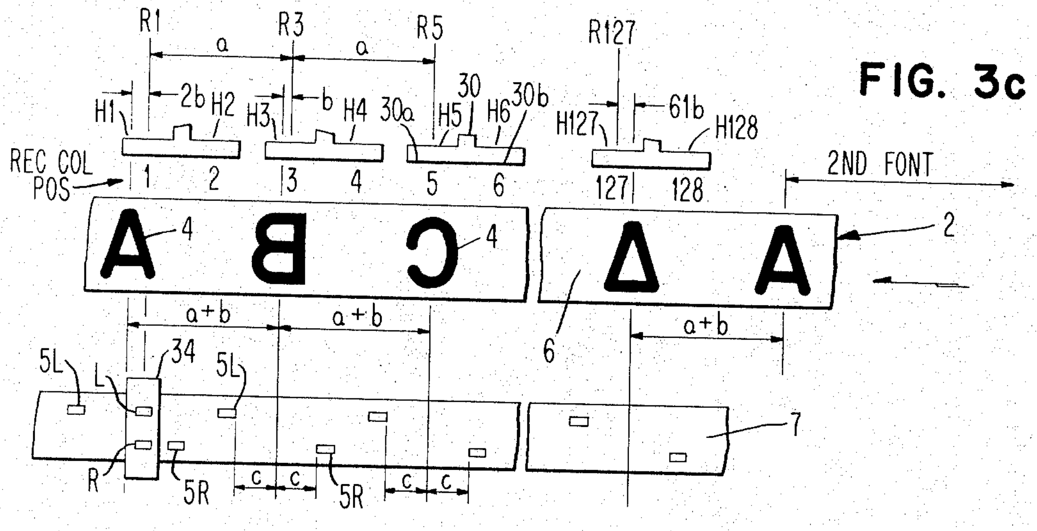

FIGURES 3*a* to 3*c* illustrate a highly schematic form of the character type offset technique employed with the print bar of FIGURE 1.

Figure 3D:
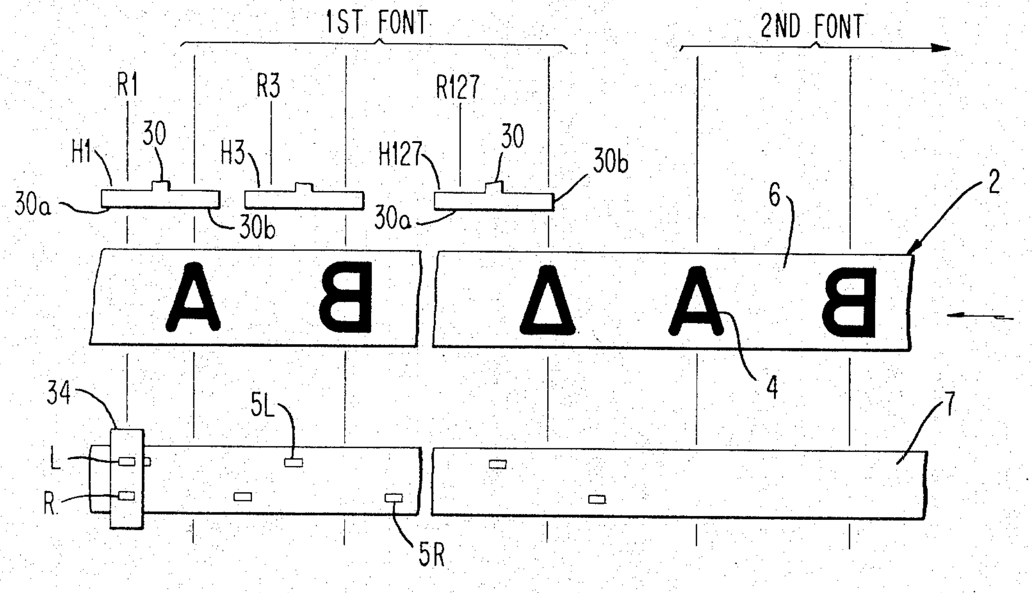
Figure 3E:
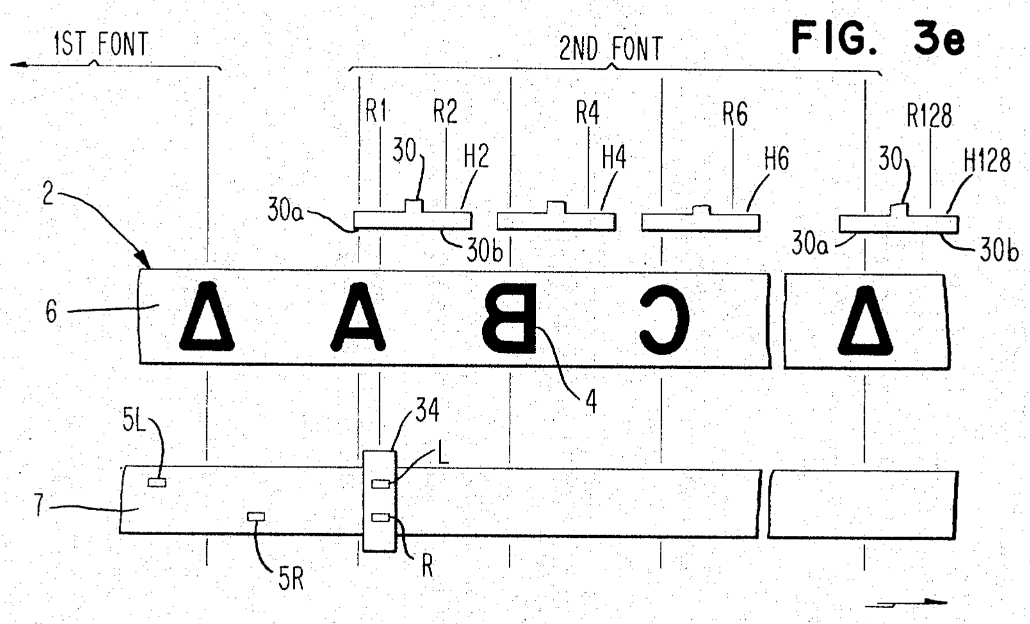

FIGURES 3*d* and 3*e* illustrate the starting positions of the print bar.

Figure 4:
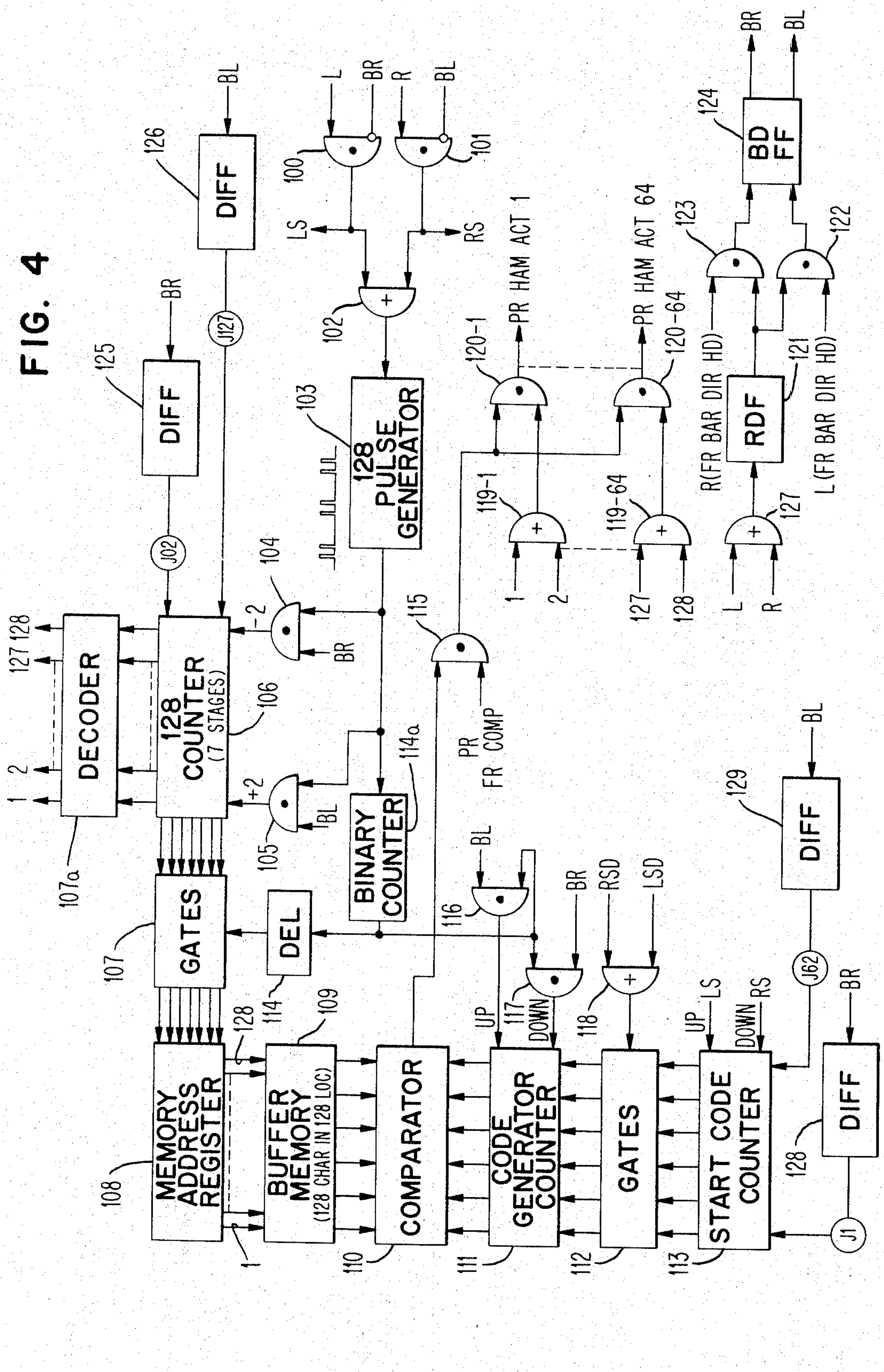

FIGURE 4 shows a block diagram of the synchronizer which may be employed with the printing bar of FIGURE 1; and FIGURE 5 is a top front view of a print bar illustrating an alternative embodiment of the character type font arrangement.

Refer now to FIGURES 1 and 2 which illustrate a print bar and its associated drive assembly. The print bar 2 of FIGURE 1 is moved between two pairs of guide rollers 10 and 12 to insure its horizontal alignment with respect to the record 8. The guide rollers 10 and 12 may be replaced by any other suitable type of bearing surface which will provide low friction and which will act to accurately control the plane and direction of the movement of bar 2. Bar 2 has affixed to its rear surface a yoke 14 mounted perpendicular to the rear surface of the bar. The yoke 14 contains a pin 16 which is mounted perpendicular to the surface of the yoke 14.

The drive assembly for the print bar 2 consists of a first sprocket 18 driven by a constant speed motor 20. A second sprocket 22 is provided and a roller chain 24 is placed around the periphery of the sprockets 18 and 22 and driven thereby. The yoke 14 is connected to the roller chain 24 by means of the pin 16, which may be affixed to the upper surface or to the outside surface of the roller chain 24. As a result of the constant speed of which motor 20 rotates and the positive connection between the sprockets 18 and 22 and the roller chain 24, the pin 16 is driven at a constant linear speed as it moves from sprocket 18 to sprocket 22 and back. As the pin 16, connected to the roller chain 24, moves from sprocket 18 to sprocket 22, the print bar 2 will be moved from left to right as shown in FIGURE 1 by the arrow. As the pin 16 moves with the roller chain 24 from sprocket 22 to sprocket 18 the print bar 2 will move from right to left.

During the period when the connection between the roller chain 24 and the print bar 2 at pin 16 moves about the end portions of the sprocket circumferences, the bar will decelerate to zero velocity and begin acceleration to the maximum linear velocity in an opposite direction. This period may be employed for movement of the record and also to provide an indication that the direction of the bar movement is about to change.

The print bar 2 (FIG. 2) is arranged with a plurality of character type mounted upon a surface 6 of the bar 2. The character type 4 is arranged in a plurality of discrete fonts, that is complete repetoires of character type which may include the full alphabet, the numerals from 0 to 9, and any of the punctuation and special symbols which may be required. There may be as many repetitions of the complete font and font portions along the surface 6 of the bar 2 as is desired. The only limitation as to the number of fonts or font portions on the print bar 2 is that each record character space be exposed to all the characters in a font. Thus, should a single font appear on the surface of the bar 2, each character on the bar would have to travel the entire distance across the width of the record 8 presented before the bar 2. By using a number of complete fonts on the surface 6 or bar 2, the movement of the bar is decreased and is equal to the length of one complete font.

Mounted in line with the character type 4 and behind the record 8 are a series of print hammers 30. Each of the print hammers 30 has face portions **30*a* and 30*b* wide enough to span two record character spaces. The centers of the print hammers 30 are aligned with the interspace between adjacent character spaces such that the print hammers 30 can strike character type 4 aligned with either of the character spaces. Due to the spacing of the character type 4 along the print bar 2, it is not possible for the print hammers 30** to strike character type in both character spaces simultaneously. Instead, one face 30*a* of the print hammers 30 is used to print in odd character spaces on the record when the character type 4 is aligned therewith and moving in a first direction. The second face 30*b* of the print hammers 30 is employed to print in even character spaces of the record when the character type 4 is aligned therewith and moving in a second opposite direction. Each of the print hammers 30 has an actuator coil 31 associated therewith, and operated by the circuit to be described with reference to FIGURE 4.

As can be seen from FIGURE 2, the surface 6 of the printing bar 2 has a plurality of fonts thereon. For example, between X1 and X2 there is a complete font starting with the character A closest to the point X1 and extending through the symbol delta closest to the point X2. One or more complete fonts of characters may be found in the area of the bar between X2 and X3.

In this embodiment it will be assumed that the font comprises 64 characters and that there are two complete fonts on the bar 2. Further, it will be assumed that a line of printed type may comprise 128 printable columns or record spaces.

The character type 4 are placed along the print bar 2 at nominal positions corresponding to every other one of the record character spaces. The spacing of the individual character type 4 along the print bar 2 is uniform but is at a fixed dimension which is larger than the character spacing on the record. That is, the distance between center lines of the characters on the bar 2 is greater than the distance between center lines for each columnar position on the record 8. If the character type A is the first character and B the second etc., the spacing between the characters C and B will be the same as the spacing between the characters B and A. Further as can be seen from FIGURE 2 there is a hammer 30 for every two column positions or character spaces on the record. Each hammer has two striking or face portions 30*a* and 30*b*, one of which, e.g. 30*a*, is associated with and spans the odd column position of the record and the other e.g. 30*b* is associated with and spans the next adjacent even column on the record 8. The center line for each face portion of the hammer 30 coincides with the center line of a column position on the record. The distance between center lines of adjacent characters on the bar 2 while uniform is slightly greater than the distance between center line of the face portions associated with two adjacent odd columns or two adjacent even columns on the record.

The reason for the greater pitch in character type spacing on the bar 2 with respect to the pitch of characters as printed in columns of the record will become more evident from the discussion to follow. As each character type 4 approaches a position of alignment with a particular record character space, a comparison must be made between the coded notation which describes the character type on the bar 2 and the coded notation which describes the character which must be printed in this record character space. The memory which stores the message to be printed in coded notations, must be addressed and its contents read out and compared to the characters on the bar 2. This operation will take a finite time period during which the print bar 2 continues to move. If decision storage elements are not used and the pitch of the record character spaces (as well as the pitch of the hammers) and characters of the font on bar 2 are the same, then the position on the record 8 at which printing would take place would be a function of the time required for addressing, read out and comparison. Thus, the characters in a row on the record would not be uniformly spaced. By changing the pitch of the characters on bar 2 with respect to the record character spaces, extra time for addressing, read out and comparison is provided so that each of the characters printed on the record 8 will be centered in its proper columnar position or record space.

As is evident from FIGURE 2, when the center line of character type A on bar 2 coincides with the center line R1 of a record column position, the center line for character type B is offset from record column position center line R3. The space *a* between center line R1 and R3 represents the spacing of the odd characters on the record 8. The distance *b* between the center line R3 and center line for the character B represents the amount of movement of the print bar during a single memory access. The center line for each succeeding character type C, D etc. has an offset which is an integral multiple of the space *b* and is measured from the center lines R5, R7 etc. for the record column positions 5 and 7 etc. Thus, for example, the center line for character type D is spaced a distance $3\times b$ from the record column position center line R7.

The uniformly increasing offset between the record column position center lines and the center lines of the characters on type bar 2 can be best seen from a consideration of FIGURES 3*a* to 3*c* to which reference is now made. These figures show in highly diagrammatic form the print hammer face portions H1, H3 and H5 etc. of the first three hammers 30 associated with column positions 1, 3 and 5 of the record, together with the portion of print bar 2 containing the character types A, B and C. The first three hammers also have face portions H2, H4 and H6 associated with positions 2, 4 and 6 of the record. The print bar 2 is shown in three sequential positions. In the first position (FIG. 3*a*), the center line for character type A is shown aligned with the center line of hammer face H1 and the first column position on the record; the center line for the character type B is shown displaced by a distance *b* from the center line of hammer face H3 and the third column position of the record. Further the center line of the character C is shown displaced by a distance 2*b* from the center line of hammer face H5 and finally the last character in the 63 character font, delta (Δ) is shown as being displaced from the center line of the 127th character position of the record by a distance 63*b*.

The bar 2 containing the type characters is in motion to the left. After the decision to print the character A in column 1 has been made the bar moves a distance *b*. The time it takes to move the bar a distance *b* is sufficient time for a further memory access and to make a determination as to whether hammer face H3 for column 3 on the record should be fired. This decision must be made before the center line of the character type B is aligned with the center line of the hammer face H3 as shown in FIG. 3*b* to allow for the time necessary to move the print hammer. It should be noted that the character type C has also moved a distance *b* and the center line thereof is now separated from the center line of hammer face H5, for column 5, by a distance *b*. As the print bar 2 continues to move a further memory access is made to determine whether the character C should be printed in the fifth column position on the record when the center line of this character is aligned with the center line of hammer face H5 as shown in FIGURE 3*c*.

The timing signals which control the operation of the print synchronizer (FIGURE 4) are produced by markers 5L and 5R on the surface 7 (see FIGURES 2 and 3) of the bar 2. The markers, which in the preferred embodiment are magnetized spots, are in two separate channels on the surface 7 of bar 2.

Each type character 4 in the first font on bar 2 has a pair of markers 5L and 5R (one from each channel) associated therewith. All the markers 5L are a uniform distance *c* to the left of the center line of the character types 4 and all of the markers 5R are a uniform distance *c* to the right of the center line.

The markers are detected by a two channel magnetic read head 34, which produces the L or left signal in response to every magnetic marker 5L and produces the R or right signal in response to magnetic markers 5R. These signals L and R are produced when the associated markers pass under the head 34.

While magnetic markers are shown, it will be readily appreciated in the light of the teaching herein by those skilled in the art that other markers, such as light reflecting surfaces etc. could be used with appropriate transducers.

The markers 5L and 5R and the signals they produce serve two functions. First it will be appreciated that neither the L or R signal will be produced when the bar 2 is changing direction, i.e. not moving. The absence of the L and R signals is detected by the print synchronizer (FIGURE 4) and as shall be explained later, the print synchronizer responds to this condition and indicates that the bar 2 is changing direction. The first marker 5R or 5L to be detected by the head 34 after the bar 2 has changed direction indicates the new direction of the bar 2 by either producing the R signal before the L signal to indicate the bar is moving right or the L signal before the R signal to indicate that the bar 2 is moving left.

To more fully understand how the markers 5L and 5R indicate the direction of the bar movement, consider the following. When the bar 2 has moved to the right and is about to change direction, the character type 4 of the first font will be to the right of the center lines of hammer faces H1, H3 etc. to H127 as shown in FIGURE 3*d*. As the bar 2 moves to the left, the head 34 detects marker 5L associated with type character A before it detects marker 5R associated with that character. Accordingly, the L signal is generated first after the bar 2 has changed direction and indicates that the bar is moving left.

When the bar 2 has completely moved to the left, as shown in FIGURE 3*e*, the character type 4 of the second font on bar 2 will be to the left of the center lines for the even hammer faces H2, H4 to H128. No markers are associated with the character type 4 of the second font. As the bar 2 moves to the right, the marker 5R associated with the character delta (Δ) of the first font is detected by head 34 and generates the R signal. Accordingly, the R signal is generated first after the bar 2 has changed direction and indicates that the bar is now moving to the right. The apparatus that responds to the L and R signals is shown on FIGURE 4.

In addition. the markers serve another function. They are used to indicate when the character type 4 will line up with the odd hammer faces H1, H3 etc. or the even hammer faces H2, H4 etc. depending on the direction of the bar 2. The lead time of the markers is substantially equal to the time it takes to address the buffer memory for all the characters which are to appear in either the odd or even columns of the line of information to be printed on the record 8, as well as the time necessary to actuate the print hammers 30.

Refer now to FIGURE 4 which illustrates the print synchronizer in block diagram form. The buffer memory 109 is an addressable memory having 128 locations wherein each location stores the representation of a character to be printed. The contents of the first location in the buffer memory will be printed in the first column position on the record 8 and the contents of the 128th location in the buffer memory 109 will be printed in the 128th column position of the record 8. The characters from intermediate locations in buffer memory 109 will be printed in corresponding intermediate columns of the record 8.

The buffer memory 109 is addressed by a counter 106 which may comprise seven stages of binary elements. Counter 106 is capable of counting in either direction, i.e., either descendingly or ascendingly, and is capable of being jammed to any specific count by a suitable input thereto. The outputs of counter 106 are transmitted through a gating array 107 into memory address register 108 which in turn causes the location in the memory 109 specified by the value in counter 106 to be read out and applied to the comparator 110.

The outputs from counter 106 are also applied through a decoder 107*a* which in turn produces individual output signals for each of the 128 counts that can be produced by counter 106.

Counter 106 receives 4 input signals. Two of these input signals BR and BL, cause the counter to be jammed to a count of 2 and 127 respectively. This is indicated in FIGURE 4 by the notation J02 and J127. The signals, BR and BL, are produced by the bar direction flip-flop BDFF124. The BR signal indicates that the bar 2 is moving in the right direction and BL signal indicates that it is moving in the left direction. The BR and BL outputs of flip-flop 124 are applied to the counter 106 via differentiators 125 and 126, respectively. It will be appreciated that while flip-flop 124 is continually producing either the BR or the BL signal the counter 106 only responds to this flip-flop when it changes state.

Counter 106 also receives the outputs of gates 105 and 104. An input from gate 105 to counter 106 causes that counter to advance one count and an input from gate 104 causes counter 106 to decrease its count by one. Gates 105 and 104 both receive the output of 128 pulse generator 103 and are additionally controlled by the BL and BR outputs respectively of flip-flop 124. Generator 103, in response to an input pulse, produces 128 spaced output signals which are applied both to gates 104 and 105 and to delay element 114 via binary counter 114*a*. Delay element 114 is connected at its output to gating matrix 107 and outputs from delay element 114 render the gating matrix 107 operative.

Binary counter 114*a* produces one signal for every two input signals received from generator 103. Thus, only every other output signal from generator 103 is applied via delay element 114 to the gating matrix 107. However, every pulse from generator 103 that passes through either 104 or 105 will cause the counter 106 either to step ascendingly or descendingly. Accordingly, the counter 106 will be stepped twice before its outputs are transmitted through gate 107 into the memory address register 108. Delay element 114 is chosen to delay the signals from pulse generator 103 and binary counter 114*a* the time necessary for the counter 106 to operate.

Generator 103 is connected at its input to the output of buffer 102 which in turn receives output signals produced by gates 100 and 101. Gates 100 and 101 are connected to receive the L and R signals respectively from the two channel magnetic read head 34 shown in FIGURES 2 and 3. In addition, gates 100 and 101 are inhibited by the BR and BL outputs from bar direction flip-flops 124.

Gate 100 operates to produce the LS signal in response to every L signal generated when the bar 2 is moving left and gate 101 operates to produce the RS signal in response to every R signal when the bar 2 is moving right. It will be appreciated since gates 100 and 101 are inhibited by the BR and BL signals respectively that only one of these gates will be operative at a time. That is, gate 100 operates when the bar is moving left and gate 101 operates when the bar is moving right.

It will be appreciated that both the L and R signals are pulses and will have a leading and trailing edge which are separated in time. Gates 100 and 101 are made responsive to the trailing edge of the L and R signals. In the alternative the L and R pulses can be suitably delayed before being applied to gates 100 and 101.

The trailing edge of L and R signals (or slightly delayed L and R signals) are also applied via buffer 127 to resettable delay flop 121. As long as resettable delay flop 121 continually receives the L and R signals from head 34 it will not produce an output signal. However, when the bar 2 is changing directions, L and R signals will not be produced and the resettable delay flop 121 recovers and produces an output signal which is applied to gates 122 and 123. These gates also receive the L and R signals respectively from head 34 and respond to the leading edge of these signals. After the bar 2 has changed direction, the next L or R signal received will be transmitted through either gate 122 or 123 to cause bar direction flip-flop 124 to either produce the BR or the BL signal, respectively. As noted before, if the bar is changing direction and its new direction is to the right, the R signal will be produced and transmitted via gate 123 to cause flip-flop 124 to indicate that the bar is moving right; if, on the other hand, the new direction of the bar 2 is left, gate 122 produces a signal to cause the bar direction flip-flop 124 to indicate the bar 2 is moving left. The trailing edge of either the L or R signal which changes the state of flip-flop 124 also passes through buffer 127 to operate resettable delay flop 121 so that the R and L signals produced during the course of the bar's movement in either the left or right direction do not pass through gates 122 or 123 and toggle the flip-flop 124.

The start code counter 113 is used to produce a code representative of the next character on the type bar 2 approaching column position 1 on the record 8 if the bar is moving left or the next character on the type bar 2 approaching column position 128 if the bar is moving right. The counter 113 is able to produce 64 counts and may comprise 6 bistable elements. It also has the facility of being able to count up or down. When the counter 113 has reached its highest or lowest count, the next input pulse thereto will cause it to produce its lowest or highest count, respectively, depending upon whether it is counting up or down.

The start counter 113 has 4 inputs, two of which jam this counter to a predetermined value. In particular, when the bar 2 starts moving left, the BL signal from the bar direction flip-flop 124 applied via differentiator 129 jams this counter to a count of 62 (binary 111110). When the bar is moving right, the BR signal applied through differentiator 128 jams the counter 113 to a count of 1 (binary 000001).

Additionally, counter 113 receives the LS signal or the RS signal when the bar is either going left or right respectively. Each LS signal increases the count in counter 113 by 1 and each RS signal decreases the count by 1. The first LS signal from gate 100 produced in response to the first marker 5L (associated with character A) causes the start code counter 113 to advance 1 count, i.e., to a count of 63 (binary 111111). The first RS signal from gate 101 produced in response to the first marker 5R (associated with character type delta) causes counter 113 to decrease 1 count, i.e. to a count of 0 (binary 000000).

In the two cases described above either the LS or RS signal is delayed by means not shown and is transmitted through a buffer 118 to activate a gating array 112. When so activated, gating array 112 transmits the value stored in counter 113 to code generator counter 111. Code generator counter 111, therefore, selectively receives the value stored in counter 113 and is jammed to that count. Thus, immediately after the BR or BL signal is developed the code generator counter 111 will have jammed thereinto either the value 63 (62+1) or 0 (1−1).

In the operation of this bar printer, after each R or L signal is produced the codes of all the characters of the font on the bar 2 must be generated, starting with the code of the character type in the font approaching position 1 or 128 on the record 8 depending upon the direction of bar movement. The codes of the characters on the bar 2 increase arithmetically so that the character A (first character in the font) is represented in the six bit code as, for example, 000000, and delta, the last character in the font is represented by 111111. The intermediate characters in the font, B, C, etc., are represented by the codes 000001; 000010; etc. in increasing order according to the rules of binary arithmetic.

As noted above, the start code counter 113 is used to indicate the position of the character type on the bar 2. In particular, if the bar 2 is moving left the counter 113 produces a count indicative of the code of the type approaching the first columnar position of the record and if the bar is moving right the counter 113 produces a count indicative of the code of the type character approaching the last columnar position on the record 8. It will be appreciated that as the bar 2 moves left the values representative of the codes of the characters approaching the first columnar position will increase and that as the bar moves right the values of the codes representative of the characters approaching the last columnar position on the record will decrease.

The code generator counter 111 is used to produce all the code representations of the entire 64 character font each time either the LS or RS signal is generated. In particular code generator 111 produces codes in ascending order when the bar is moving left and in descending order when the bar is moving right. Like counter 113 code generator counter 111 automatically recycles either to its highest or lowest count depending upon whether it is counting up or down.

The code generator counter 111 receives the outputs of gates 116 and 117 which cause the counter 111 to increase or decrease its count by 1, respectively. Gate 116 is activated by the BL signal from the bar direction flip-flop 124 and gate 117 is activated by the BR signal from that flip-flop. Both gates 116 and 117 receive every other output from pulse generator 103 via binary counter **114*a***.

The outputs of code generator counter 111 are applied to one input of comparator 110 which also receives the output of the buffer memory 109. Each time the character represented by the code generator counter 111 and the character read out of a particular location in the memory 109 are the same, the comparator 110 produces a signal which is applied via gate 115 to the 64 print hammer actuator gates 120–1 to 120–64.

The gate 115 is rendered operative by a print signal PR from a computer or external control device when printing is to take place.

Each of the 64 gates 120–1 to 120–64 controls a 2 column print hammer. In particular an output from gate 120–1 causes the print hammer 30 associated with the first two columns of the record 8 to be fired and an output from gate 120–64 causes the print hammer 30 associated with the last column on the record to be fired. Intermediate gates 120–2 to 120–63 (not shown) control corresponding print hammers.

Each of the gates 120 receives an output from a buffer 119 and is controlled thereby. Buffer 119–1 receives the first and second outputs from decoder **107*a* and renders gate 120–1 operative on either of these counts. Similarly, buffer 119–64 receives the 127th and 128th outputs from decoder 107*a* and renders gate 120–64 operative on either of these counts. Intermediate buffers 119–2 to 119–3** (not shown) control the gates which fire the intermediate hammers.

*Operation*

In explaining the operation of the printer it will be assumed that the memory 109 has been preloaded with the 128 characters for a line of printing. Further it will be assumed that the PR signal does not activate gate 115 to commence printing until either a BR or BL signal is produced. This can easily be accomplished by deriving the PR signal from a flip-flop which is set during the bar dwell time and reset thereafter by the generation of both the BR and BL signals. Additionally it will be assumed that the bar is moving right just prior to the commencement of a new print operation.

After the bar 2 has finished moving right and during the dwell or bar turnaround time, buffer 127 will not receive either the L or R signals from head 34 and allows resettable delay flop 121 to render gates 122 and 123 operative. After the bar turns around, it moves left and the marker 5L associated with character type A is detected by head 34 which in turn produces the L signal. The leading edge of the L signal is transmitted to the bar direction flip-flop 124 via gate 122 and causes the BL signal to be produced. The trailing edge of the same L signal triggers the resettable delay flop 121. As the bar 2 continues to move left additional L and R signals reset element 121.

The BL signal jams start code counter 113 to a value of 62 and jams counter 106 to a value of 127. Additionally the BL signal renders gates 105 and 116 operative at the step up inputs of counters 106 and 111 respectively. Further, the BL signal acts to inhibit gate 101 from transmitting the R signals produced as the bar moves left.

The trailing edge of the L signal (or the delayed L signal) is transmitted through gate 100 to generate the LS signal which actuates pulse generator 103. The LS signal is also applied to the step up input of the start code counter 113 and causes the count therein to be increased by 1 to a value of 63. This count is transmitted via gates 112 into the code generator counter 111 and counter 111 is jammed to a value of 63. Gates 112 are rendered operative by the delayed LS signals, i.e. LSD signals, applied via buffer 118.

In response to the LS signal, generator 103 produces 128 spaced pulses, preferably having the wave form shown just above this element on FIGURE 4. The first two closely spaced pulses produced by generator 103, pass through gate 105 and cause counter 106 to advance 2 times, i.e., from a counter of 127 to a count of 1. The second of these two pulses (i.e., every other output of pulse generator 103) causes binary counter **114*a* to produce an output which is applied via delay element 114 to render gating array 107 operative and via gate 116 to step code generator counter 111 up 1 count to 000000. The value in the code generator counter 111 is now representative of the letter A which is the character on bar 2 approaching the first column position on the record 8**.

The value 1 from counter 106 is received by the memory address register 106 via gates 107. Memory address register 108 in turn addresses the first storage location in memory 109 and causes the contents thereof to be applied to the comparator 110. Comparator 110 also receives the code for the letter A from code generator 111 and if there is a match, the letter A will be printed in column 1 of the record. Upon detecting a match between the character stored in the first location in the memory and the character type A approaching the first columnar position of the record, comparator 110 produces a signal which is transmitted via gate 115 to all of the print hammer actuator gates 120–1 to 120–64. Since counter 106 presently is set to a count of 1, only gate 120–1 connected to the first print hammer 30 will be activated. This occurs via decoder **107*a* and buffer 119–1**.

The sprocket 5L associated with type character A on the bar 2 which commenced the above operation causes an L pulse to be generated long before the center line of the type character A is lined up with the center line of hammer face H1 as it strikes the record (see FIG. 3*a*). This lead time is provided to allow time for the aforementioned operations comprising advancing the various counters, addressing the memory 109 and comparing the contents thereof with the value in code generator counter 111 as well as time for the actuation of an electromechanical print hammer. During this lead time the codes for the remaining characters of the font (B, C, D etc.) are produced in ascending order and are compared with the contents of the remaining odd locations in memory 109. The interval between every other pulse from generator 103 is equal to the time necessary to advance counters 111 and 106, read out memory 109 and compare the contents with the value of counter 111. During the same interval the bar 2 moves to the left the offset distance *b* (see FIGS. 2 and 3). The next pair of pulses from generator 103 advances counter 106 twice to address for memory location 3 in memory 109 via gating array 107 and memory register 108. The same pulses also cause code generator counter 111 to advance one count, via binary counter **114*a* and gate 116, to a value representative of the next letter, B, in the font. The comparator 110 receives the outputs of both elements 109 (contents of memory location 3) and 111 (code for the letter B) and if comparison is obtained, the print pulse is applied via gate 115 and buffer 120–2 (not shown) to the second electromechanical print hammer. This print pulse is applied to cause the hammer face 3 to strike the record 8** when the character B is in the proper position (see FIG. 3*b*).

This operation continues until the code generator counter 111 produces values representative of all the characters in the font in ascending order and the contents of each of the odd locations in memory 109 are compared therewith.

It should be noted that the last (64) character in the font is offset by the amount $63 \times b$ because 63 memory address and compare operations take place before it lines up with the last odd column position (127) on the record.

At the end of this first operation the counter 106 will have recycled and have a count of 127, the start code counter 113 will still have a value of 111111 and code generator counter 111 will have a value indicative of the last character (delta) in the font.

As the bar 2 continues to move left, the marker 5L in advance of the letter B is detected and the new LS signal is transmitted via gate 100 to activate pulse generator 103 and to advance the start code counter 113 from the value 111111 to 000000. This latter value is jammed into the code generator counter 111 via gates 112 as previously described.

The first output of binary counter **114*a* produced in response to a pair of pulses in generator 103 is transmitted via gate 116 to the step input of the code generator counter 111. The counter 111 is thereby advanced to 000001 which is representative of the letter B, the next character approaching the first columnar position on the record 8. In the same manner previously described the code generator 111 is stepped to produce all the codes of the font in ascending order, this time starting with the letter B and ending with the letter A. The memory 109 is again addressed for all odd locations beginning with location 1**. Comparison and printing takes place as before.

The third marker 5L detected in advance of the letter C causes a similar operation to take place only this time the code generator counter 111 starts producing codes beginning with the letter C and ending with the letter B.

When the last character, delta, approaches column position 1 of the record, the marker associated therewith and the L pulse produced thereby causes a similar operation except that now the code generator counter 111 begins its count with the value indicative of the character delta and ends with a value indicative of the letter A.

After the bar 2 has completely moved to the left (see FIG. 3*e*), the contents of each of the odd locations in memory 109 have been compared with the codes of all the characters in the font and printing in the odd columns of the record is completed.

After the bar 2 is finished moving to the left (see FIG. 3*e*) and during the bar dwell or turnaround time, the buffer 127 again will not receive either the L or R signals from head 34. Therefore, resettable delay flop 121 receives no inputs via buffer 127 and recover so that the gates 122 and 123 are rendered operative. After the bar 2 turns around, it moves right and the marker 5R associated with the character type delta of the first font is detected by head 34 which in turn produces the R signal. The leading edge of the R signal is transmitted to the bar direction flip-flop 124 via gate 123 and causes the BR signal to be produced. The trailing edge of the same R signal (or the delayed R signal) retriggers delay flop 121. As the bar 2 continues to move right, additional L and R signals retrigger element 121.

The BR signal jams start code counter 113 to a value of 000001 and jams counter 106 to a value of 2. Additionally the BR signal renders gates 104 and 117 operative at the step down inputs of counter 106 and 111, respectively. Further, the BR signal acts to inhibit gate 100 from transmitting the L signals produced as the bar 2 moves right.

The trailing edge of the R signal (or the delayed R signal) is transmitted through gate 101 to generate the RS signal which actuates pulse generator 103 via buffer 102. The RS signal is also applied to the step down input of start code counter 113 and causes the count therein to be decreased by 1 to a value of 000000. This count is transmitted via gates 112 to the code generator counter 111 which is jammed to the value 000000. Gates 112 are rendered operative by delayed RS signals, i.e., RSD signals applied via buffer 118.

In response to the RS signal, generator 103 again produces 128 spaced pulses. The first two pulses produced by generator 103 pass through gate 104 and cause counter 106 to be stepped down from 2 to a count of 128. As previously described, the second of these two pulses causes binary counter 114*a* to produce an output. This output is applied via delay element 114 to render gating array 107 operative and to code generator counter 111 via gate 117. The output of gates 117 steps the count down from 000000 to a count of 111111. The value in the code generator counter 111 is now representative of letter delta, which is the type character on bar 2 approaching the last column position on the record 8.

The value 128 from counter 106 is received by the memory address register 106 via gates 107. Memory address register 108 in turn addresses the last storage location in memory 109 and causes the contents thereof to be applied to the comparator 110. The comparator 110 at this time receives the code for the letter delta from code generator 111 and if there is a match, the letter delta is printed in column 128 of the record. Upon detecting a match between the character stored in the last location of the memory and the character type delta approaching the last column position of the record 8, comparator 110 produces a signal which is transmitted via gates 115 to all of the print hammer actuator gates 120–1 to 120–64. Since counter 106 presently is set to a count of 128, only gate 120–64 connected to the last print hammer 30 will be activated. This occurs via decoder 107*a* and buffer 119–64.

The sprocket 5R associated with type character delta (of the first font) on the bar 2 causes an R pulse to be generated long before the center line of character type delta (in the second font) is lined up with the center line of hammer face H128 as it strikes the record. This lead time is provided to allow for the aforementioned operations comprising advancing to various counters, addressing the memory 109 and comparing the contents thereof with the value in the code generator counter as well as for the actuation of an electromechanical print hammer. As the bar is moving right and during this lead time, the codes for the remaining characters in the font starting with delta and ending with the letter A, in that order, are all compared with the contents of the remaining even locations in memory 109 starting with locations 128 and ending with memory location 2.

It should be appreciated that the codes produced by code generator counter 111 must be generated is descending order and that the even locations in the memory 109 must also be addressed in descending order when the bar 2 is moving right. In this case the center line of the character type approaching the last column on the record 8 will line up with the center line of the hammer face 128 before the character type approaching the second column on the record 8 lines up with the center of hammer face 2. In particular, when the center line of the character type delta is lined up with the center line of hammer face 128, the center line of the letter A will be to the left of the center line of the hammer face H2 by a distance $63 \times b$.

The operation for printing characters in the even column spaces of the record is much the same as that described for printing in the odd column spaces and will not be described in detail. Suffice it to say that when the bar is moving right, each marker 5R activates pulse generator 103, which transmits pulses via step down gates 116 and 104 to counters 106 and 111, respectively. Counter 106 addresses all the even locations in memory 109 in descending order, starting with location 128 and ending with location 2. Code generator counter 111 produces the codes for all of the characters in the font beginning with the character determined by the value of the start code counter 113. The code generator counter 111 produces the code for each character in the font in decreasing order. Each marker 5R also produces a pulse which steps the start code counter 113 down one count. When the bar is moving right the start code counter 113 indicates which character on the bar is approaching the last column position on the record and therefore indicates the value that should be placed in the code generator counter 111 before it generates all the codes of the font in decreasing order.

In the embodiment described, printing of all the characters in the even column positions on the record is ended after 64 markers 5R are detected; that is, after every character in the font passes every even column on the record 8.

If desired a single width print hammer 30 may be employed with suitable adjustment of the character type spacing, counter initial conditions and counting sequences as set forth above.

Turning now to FIGURE 5 further arrangement of the character type 4 upon the print bar 2 is shown. In this arrangement a limited repetiore of character type is employed using the same overall print bar dimensions as the print bar 2 of FIGURES 1 and 2 but permitting the printing of a full print line for each direction of movement of the print bar 2. The character type 4 for both the font between the reference points $X_1$ and $X_2$ and $X_3$ and $X_4$ are on alternate record character spaces (e.g. columns 1, 3, 5, etc.) and are each offset as described above. This offset is maintained along the entire print bar 2 length as if there were a character type at each alternate space. Between the reference points $X_2$ and $X_3$ is a blank space required to permit print hammer actuator circuit recovery should the same actuator circuit be needed in two consecutive print operations and to match the two limited fonts to the length of print bar 2 employed with full fonts. The minimum length of this space is the print hammer actuator circuit recovery time, there is no upper limit. Further, the space is not an even number of multiples of the character type spacing but is instead an even number of multiples plus the spacing of a single record character space. For example, if two 16 character type fonts are employed the spacing will be equal to 31 record character spaces. The effect of this spacing is to effectively move the second font one record character space to the left and in line with the even record character spaces.

The print bar 2 of FIGURE 5 is employed with a double width hammer and with the character type spacing set out above, the odd record character spaces will be printed in by the character type in the font between reference points $X_1$ and $X_2$ and the even record character spaces will be printed in by the character type in the font between reference points $X_3$ and $X_4$.

The operation of the device of FIGURE 5 will be similar to the operation of the device described above.

While a particular form of synchronizer or print control has been described for the purpose of presenting the best mode contemplated for carrying out the invention, it should be understood that the bar printing mechanism described herein may be used with other forms of synchronizers and print controls, and it is not intended to limit the scope of the invention in any manner by the disclosed and described print synchronizer, which also has utility in other separate and distinct arrangements.

In this regard it should be recognized that counter 106 may be replaced with two separate counters; one for addressing even locations in the memory and one for addressing odd locations in the memory. Further, it should be appreciated that the code generators 111 and 113 may in fact comprise specific locations of a large addressable memory in combination with an adder. The cycling of the code generators 111 and 113 and the addressable counter 106 may also be controlled by other apparatus than generator 103 and binary counter 114*a*. For example, elements 111, 113 and 106 may be stepped by signals directly generated by the print bar 2.

While there have been shown and described and pointed out the fundamental novel features of the invention as applied to preferred embodiments, it will be undestood that various omissions and substitutions and changes of the form and details of the device as illustrated and in its operation may be made by those skilled in the art, without departing from the spirit of the invention.

The embodiments of the invention in which an exclusive property or privilege is claimed are defined as follows:

1. In an apparatus for printing a plurality of characters in a plurality of character spaces across the width of a record the combination comprising: a reciprocating type carrier mounted for to and fro movement across said character spaces of said record, said type carrier having a plurality of character types uniformly disposed in a first pitch on a surface thereof and a plurality of selectively operable print hammer means uniformly disposed adjacent the character spaces of said record in a second pitch different than said first pitch and positioned to cause selected ones of said character types on said carrier to be printed in the character spaces on said record as said type carrier moves across said record.

2. The apparatus defined in claim 1 wherein the pitch of the character spaces and said hammer means are the same and the pitch of said character types is greater than the pitch of said character spaces and hammer means.

3. The apparatus defined in claim 2 wherein each hammer means has a pair of print hammer faces, each face spanning one of two adjacent character spaces and disposed so that the pitch of every other print hammer face is less than the pitch of the character types on said carrier.

4. The apparatus defined in claim 3 wherein said character types are disposed on said carrier as to be in operative relationship to adjacent alternate spaces of said record when said hammer means are operated to cause selected ones of said character types to be printed in the character spaces on said record as said type carrier moves across said record.

5. The apparatus defined in claim 1 wherein the character types on said carrier are in a predetermined order and comprise at least one font and including drive means coupled to said type carrier for moving said type carrier in a line across said character spaces of said record, and a first code means controlled by said type carrier for generating a representation of the first character type next to reach a predetermined character space of said record as said carrier moves across said record.

6. The apparatus defined in claim 5 further including markers on a surface of said carrier, wherein each character has a marker in advance relationship thereto as said carrier moves toward said predetermined character space, means operatively coupled to said carrier for producing a marker signal in response to each marker and coupling means for transmitting said marker signal to said first code means for controlling said first code means.

7. The apparatus defined in claim 6 further including a second code means coupled to receive the representation stored in said first code means for cyclically generating representations of the type characters in said font on said carrier in order starting with the representation of the character type transferred thereinto from said first code means and completing its cycle before the second character type adjacent said first character type reaches said predetermined character space on said record.

8. The apparatus defined in claim 1 wherein the character types on said carrier are in a predetermined order and including drive means coupled to said type carrier for moving said carrier across said character spaces of said record, a cyclic code means controlled by said type carrier for generating a plurality of representations of character types on said carrier in order starting with the representation of the first character type next to reach a predetermined character space of said record, said cyclic code means completing its cycle before the second character type adjacent said first character type reaches said predetermined character space on said record.

9. The apparatus defined in claim 8 further including a character addressable memory having a plurality of locations storing the characters of a message to be printed in a line of the record, addressing means for synchronously addressing said memory in a predetermined order of addresses with the generation of the representations of character types on said carrier by said code means and a comparison means coupled to said code means and said memory for comparing the contents of the locations of said memory in order with the character type representations as they are generated in order and for producing a print signal when comparison is obtained.

10. The apparatus defined in claim 9 further including markers on a surface of said carrier, wherein each character type has a marker in advance relationship thereto as said carrier moves toward said predetermined character space and means operatively coupled to said carrier for producing a marker signal in response to each marker on said carrier and in advance of the time said character type associated therewith is in line with said predetermined character space on said record and coupling means for transmitting said marker signals to said addressing means and to said cyclic code means.

11. The apparatus defined in claim 10 wherein said coupling means includes a signal generator responsive to said marker signal for generating a plurality of step signals, said code generator being responsive to said step signals to produce all the code representations of said font and said addressing means being responsive to said stepping signals for producing the addresses of all the locations in said memory in a predetermined order for the characters of at least a portion of the message to be printed in a line on the record.

12. The apparatus defined in claim 9 including a switch means coupled to control said print hammer means connected to receive said print signal and controlled by said addressing means for switching said print signal to a print hammer means in accordance with the location in said memory last addressed.

13. The apparatus defined in claim 11 including a switch means coupled to control said print hammer means connected to receive said print signal and controlled by said addressing means for switching said print signal to a print hammer means in accordance with the location in said memory last addressed.

14. The apparatus defined in claim 8 wherein said drive means comprises apparatus for moving said carrier alternately in first and second directions across said record, direction indicating means coupled to said carrier and controlled thereby for producing first and second signals indicating respectively the direction of said carrier, said first and second signal being coupled to said cyclic code means which in response to said first signal produces said character type representations in ascending order and in response to said sginal produces said character type representations in descending order.

15. The apparatus defined in claim 14 wherein said cyclic code means is controlled by said first signal to start its operation at a code representative of a character type to next reach a first predetermined character space on said record and is controlled by said second signal to start its operation a code representation of a character type to next reach a second predetermined character space on said record.

16. The apparatus defined in claim 15 wherein said first predetermined character space is the first character space on said record and said second predetermined character space is the last character space on said record.

17. The apparatus defined in claim 9 wherein said drive means comprises apparatus for moving said carrier alternately in first and second directions across said record, direction indicating means coupled to said carrier and controlled thereby for producing first and second signals indicating respectively the direction of said carrier, said first and second signals being coupled to said cyclic code means which in response to said first signal produces said character type representations in ascending order and in response to said second signal produces said type carrier in descending order, said first and second signals being further coupled to said addressing means which in response to said first signal produces addresses in said memory in ascending order and in response to said second signal produces addresses in said memory in descending order.

18. The apparatus defined in claim 9 wherein each hammer means has a pair of print hammer faces, each space spanning one of two adjacent character spaces and disposed so that the pitch of every other print hammer face is less than the pitch of the character types on said record, said drive means comprising apparatus for moving said carrier alternately in first and second directions across said record, direction indicating means coupled to said carrier and controlled thereby for producing first and second signals indicating respectively the direction of said carrier, said first and second signals being coupled to said cyclic code means which in response to said first signal produces said character type representation in ascending order and in response to said second signal produces said character type representations in descending order, said first and second signals further being coupled to said addressing means which in response to said first signal produces every other address in said memory in ascending order and in response to said second signal produces every other address in said memory in descending order, the locations addressed in ascending order being different than the locations addressed in descending order.

References Cited

UNITED STATES PATENTS

| | | | |
|---|---|---|---|
| 2,874,634 | 2/1959 | Hense | 101—93 |
| 2,936,704 | 5/1960 | Hense | 101—93 |
| 2,993,437 | 7/1961 | Demer et al. | 101—93 |
| 3,007,399 | 11/1961 | Sasaki et al. | 101—93 |
| 3,048,330 | 8/1962 | Hense | 235—151.22 |
| 3,099,206 | 7/1963 | Hense | 101—93 |
| 3,128,693 | 4/1964 | Thiemann | 101—93 |
| 3,209,682 | 10/1965 | Cooper et al. | 101—93 |
| 3,212,435 | 10/1965 | Walker | 101—93 |
| 3,220,343 | 11/1965 | Wasserman | 101—93 |
| 3,247,788 | 4/1966 | Wilkens et al. | 101—93 |

WILLIAM B. PENN, *Primary Examiner.*

UNITED STATES PATENT OFFICE

CERTIFICATE OF CORRECTION

Patent No. 3,342,127 September 19, 1967

Solomon H. Pitt

It is hereby certified that error appears in the above numbered patent requiring correction and that the said Letters Patent should read as corrected below.

Column 16, line 72, for "said sginal" read -- said second signal --.

Signed and sealed this 29th day of October 1968.

(SEAL)
Attest:

Edward M. Fletcher, Jr.
Attesting Officer

EDWARD J. BRENNER
Commissioner of Patents